Patent 3,576,005 — Apr. 20, 1971

3,576,005
BIS HETERO CYANOACRYLAMIDES

Albert F. Strobel, Delmar, and Sigmund C. Catino, Castleton, N.Y., assignors to GAF Corporation, New York, N.Y.
No Drawing. Continuation-in-part of application Ser. No. 601,346, Dec. 13, 1966, which is a continuation-in-part of application Ser. No. 242,889, Dec. 7, 1962. This application Feb. 28, 1969, Ser. No. 803,422
Int. Cl. C09b 23/00
U.S. Cl. 260—332.2     18 Claims

ABSTRACT OF THE DISCLOSURE

Essentially colorless compounds useful as absorbents for ultraviolet light and stabilizers for organic materials, such compounds being of the general formula:

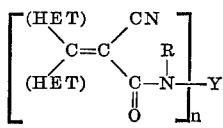

wherein:
(a) (HET) is a monocyclic heterocyclic nucleus or corresponding benzo monocyclic heterocyclic nucleus;
(b) $n$ is an integer of 1 or 2;
(c) R is hydrogen, alkyl, aryl or the atoms necessary to form a heterocyclic ring with N and Y when $n=1$;
(d) when $n=1$ Y is hydrogen, alkyl, aryl or the atoms necessary to form a heterocyclic ring with N and R; and
(e) when $n=2$, Y is a bivalent bridging radical.

---

This application is a continuation-in-part application of copending application Ser. No. 601,346, filed Dec. 13, 1966, now abandoned, which in turn is a continuation-in-part of application Ser. No. 242,889, filed Dec. 7, 1962, now abandoned.

The present invention relates to new and useful compounds which impart to organic materials superior resistance to degradation and deterioration when they are exposed to actinic radiation, and, in particular, to ultraviolet radiation. More particularly, the present invention is directed to certain novel bis hetero cyanoacrylamides which are particularly useful in protecting organic material from the degradative effects of ultraviolet light.

Various organic compounds exhibit the power to absorb electromagnetic radiations within the band of 2900 to 3700° A. and when incorporated in various plastic materials such as transparent sheets, the resultant sheets act as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products, and the like.

Numerous organic compounds have been suggested as absorbents for the range of radiations described above, which range is designated as the ultraviolet range. Such uses include incorporation in plastic sheet materials and the stabilization in general of transparent plastic bodies. By far the greatest concern with respect to ultraviolet radiations is with those radiations which come from the sun. Most of these radiations have wave lengths between 250 and 400 millimicrons. The effects of such radiation on the human skin, producing sunburn and suntan, are of course well known. Other effects, however, of great commercial importance, relate to the photochemical degradation caused by ultraviolet radiation. Many commercial products are either unstable when subjected to such radiations, or are affected to the extent that they become undesirable or unsalable. Many plastic materials, when exposed to this radiation, undergo substantial degradation resulting in the development of undesirable color bodies, and subsequent loss of transparency. Food products, in addition to becoming discolored, often become unfit for human consumption. Thus, prolonged exposure of fruits, edible oils, butter and other prepared foods, will spoil and turn rancid on exposure to ultraviolet light. It is well known that colored objects such as dyed textiles, will fade on exposure to sunlight, and in particular to ultraviolet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

It has now been discovered in accordance with the present invention that by combining bis hetero cyanoacrylamides with organic materials, there results compatible combinations withs a vast number of film-forming plastics, resins, gums, waxes and the like, which combinations further exhibit outstanding ultraviolet absorbing properties within the generally encountered ultraviolet region of 250 to 400 millimicrons. The compounds with which this invention is concerned, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film, or a dyed textile. Many of the compounds of this invention also absorb some visible light on the violet end of the spectrum which renders them particularly useful in many formulations which are susceptible to visible light degradation. Thus, polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such epoxys, melamines and the like. While the compounds of the present invention do not require an hydroxyl group, the presence thereof is not disadvantageous, or a detriment, where alkaline sensitivity is no problem.

It is, therefore, an object of the present invention to provide new and useful compounds characterized by outstanding ultraviolet-absorbing properties.

It is still another object of this invention to provide new and useful bis hetero cyanoacrylamides which are outstanding ultraviolet absorbing compounds.

Other objects and advantages of the novel compounds of the present invention will become more apparent from the following more detailed description of the present invention.

The bis hetero cyanoacrylamides of the present invention exhibit a prominent absorption peak or peaks between 250 A. and 400 A. and are devoid of nitro groups and nuclear bonded amino groups. Such compounds have the following general formula:

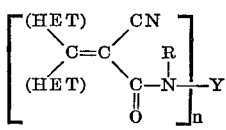

wherein:

(a) (HET) is a monocyclic heterocyclic nucleus or corresponding benzo monocyclic heterocyclic nucleus;
(b) *n* is an integer of 1 or 2;
(c) R is hydrogen, alkyl, aryl or the atoms necessary to form t heterocyclic ring with N and Y when *n*=1;
(d) when *n*=1 Y is hydrogen, alkyl or the atoms necessary to form a heterocyclic ring with N and R; and
(e) when *n*=2, Y is a bivalent bridging radical.

Accordingly, the moieties represented by (HET) as set forth in the above general formula independently represent a 5- or 6-membered monocyclic heterocyclic nucleus or the corresponding benz-5- or 6-heterocyclic nucleus wherein the hetero atoms are selected from oxygen, nitrogen and sulfur, the heterocyclic nucleus containing at least one pair of conjugated double bonds. Such 5- or 6-membered heterocyclic nuclei are those in which from 1–3 hetero atoms selected from oxygen, nitrogen, and sulfur are separated by carbon atoms. Examples of suitable heterocyclic nuclei, therefore, include:

thiophene           imidazole
furane              2-isoimidazole
pyrrole             1,2,3-triazole
α-pyran             1,2,4-triazole
α-pyrone            tetrazole
pyridine            1,3,4-oxadiazole
1,2-dihydropyridine 1,2,5-oxadiazole
oxazole             1,2,3-thiadiazole
thiazole            1,2,3-oxathiazole
isoxazole           pyridazine
isothiazole         pyrimidine
pyrazole            pyrazine
3-isopyrazole       1,3,5-triazine Examples of fused ring heterocyclic nuclei with benzene include:

benzothiophene      benzimidazole
benzofurane         1,2,3-benztriazole
cinnoline           benzoxazole
phthalazine The hetero nuclei may contain alkyl, substituted alkyl, halogen, acyl, sulfonyl, carboxamido, oxy and similar inert substituents which may vary the ultraviolet absorption spectrum but which do not affect the function and stability of the compounds. Such substituents include:

alkyl
methyl
ethyl
n-propyl
iso-propyl
n-butyl
iso-butyl
tertiary-butyl
secondary-butyl
n-amyl
iso-amyl
tertiary-amyl and the other isomeric amyls
n-hexyl
iso-hexyl and the other isomeric hexyls
n-heptyl
iso-heptyl and the other isomeric heptyls
n-primary nonyl (nonyl-1)
nonyl-(2)
nonyl-(3)
nonyl-(5)
2-methyl-octyl-2
4-ethyl-heptyl-4
2-methyl-4-ethyl-hexyl-4
n-primary octyl
octyl-(2) (capryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-primary decyl (decyl-1)
decyl-4 (secondary decyl)
2-ethyl-octyl-3 (tertiary decyl)
4-propyl-heptyl-4 (tertiary decyl)
undecyl-1 (n-primary undecyl)
undecyl-2 (n-secondary undecyl)
dodecyl-1 (n-dodecyl)
tridecyl-1 (n-tridecyl)
tridecyl-7
3-ethyl-undecyl
tetradecyl-1 (n-tetradecyl)
pentadecyl-1 (n-pentadecyl)
pentadecyl-8
hexadecyl (cotyl)
heptadecyl-9
octadecyl-1
2-methyl heptadecyl-2
eicosyl-1
docosyl-1
tricosyl-12
tetracosyl
tricapryl
pentacosyl
hexacosyl
heptacosyl
octacosyl
nonacosyl
myrisyl (30 carbon)
alkenyl
    allyl ($CH_2$=$CHCH_2$—)
    methallyl ($CH_2$=$C(CH_3)CH_2$—)
    crotyl ($CH_3CH$=$CHCH_2$—)
    butenyl-1 ($CH_2$=$CH$—$CH_2CH_3$)
    pentenyl-1
    γ-isopropyl allyl
    β-ethyl-3-propyl allyl
    2-methyl-octenyl-6
    decenyl-1
    decenyl-2
    undecenyl
    dodecenyl-2
    octadecenyl
    docosenyl
    pentamethyl eicosenyl
substituted alkyl
    cyanoethyl
    cyano-n-propyl
    cyano-isopropyl
    cyano-n-butyl
    cyano-isobutyl
    cyano-n-amyl
    cyano-isoamyl
    cyanohexyl
    cyanoheptyl
    cyano-n-octyl
    cyano-nonyl
    cyanodecyl
    cyanolauryl
    cyanostearyl and the like
hydroxyethyl
hydroxy-n-propyl
hydroxy-isopropyl
hydroxy-n-butyl
hydroxy-isobutyl hydroxy-n-amyl
hydroxy-isoamyl
hydroxy-hexyl
hydroxy-heptyl
hydroxy-nonyl
hydroxy-decyl
hydroxy-lauryl
hydroxy-stearyl and the like
carbomethoxyethyl
carbomethoxypropyl
carbomethoxybutyl
carbomethoxyamyl
carbomethoxyhexyl
carbethoxypropyl
carbethoxybutyl, etc.
carbopropoxyethyl
carbopropoxypropyl
carbopropoxybutyl, etc.
carbobutoxybutyl, etc.
chloroethyl
chloropropyl (n-propyl, isopropyl)
chlorobutyl (n-butyl, isobutyl, etc.)
chloroamyl
chlorohexyl
chlorodecyl
chlorolauryl, and the like
bromethyl
bromopropyl (n-propyl, isopropyl)
bromobutyl (n-butyl, isobutyl, etc.)
bromoamyl
bromohexyl
bromodecyl
bromolauryl, and the like
methoxyethyl
methoxypropyl (n-propyl, isopropyl)
methoxybutyl (n-butyl, isobutyl, etc.)
methoxyamyl
methoxyhexyl
methoxydecyl
methoxylauryl, and the like
ethoxyethyl
ethoxypropyl (n-propyl, isopropyl)
ethoxybutyl (n-butyl, isobutyl, etc.)
ethoxyamyl
ethoxyhexyl
ethoxydecyl
ethoxylauryl, and the like
hydroxyethoxyethyl
hydroxyethoxypropyl
hydroxyethoxybutyl
hydroxyethoxyamyl
hydroxypropoxyethyl
hydroxypropoxypropyl
hydroxypropoxybutyl
hydroxypropoxyamyl
hydroxy butoxyethyl
hydroxybutoxypropyl
hydroxybutoxybutyl
hydroxybutoxyamyl
halogen
    fluorine
    chlorine
    bromine
    iodine
acyl
    acetyl
    propionyl
    butanoyl
    amoyl, etc.
    benzoyl
    toluoyl
    naphthoyl, etc.
sulfonyl
    $CH_3SO_2$
    benzene sulfonyl
    toluene sulfonyl, etc.
oxy
    hydroxy
    methoxy
    ethoxy
    hydroxyethoxy, etc.
carboxamido (—$CONH_2$)
    N-methyl carboxamido ($CONHCH_3$)
    N-ethyl-carboxamido
    N-dimethyl carboxamido
    N-diethyl carboxamido, etc.

As indicated above, Y is selected from hydrogen, alkyl, alkenyl, aryl, as well as substituted alkyl and substituted aryl and the non-metallic atoms, i.e., carbon atoms, necessary to complete a heterocyclic ring with N and R. With respect to the alkyl and substituted alkyl groups for Y any of the aforementioned groups can be advantageously employed. Thus, the alkyl group is preferably one which contains from 1 to 30 carbon atoms, the optional substitution being selected from cyano, hydroxy, carboalkoxy, halogen, alkoxy, hydroxyalkoxy, etc.

Suitable aryl and substituted forms thereof include such as, for example:
phenyl
tolyl
xylyl
cumyl
α-naphthyl
β-naphthyl
α-anthraquinonyl
β-anthraquinonyl
γ-anthraquinonyl
phenanthranyl
diphenyl and alkyl substituted derivatives thereof substituted aryls, e.g., anisole
phenetole
p-diethoxyphenyl
1-methoxy phenanthryl
α-naphthylmethylether
β-naphthylmethylether
α-naphthylethylether
β-naphthylethylether
hydroxyethyl phenyl
hydroxypropyl phenyl
chlorophenyl
bromophenyl
1,2-dichlorophenyl
1,3-dichlorophenyl
1,3,5-trichlorophenyl
1,2-dibromophenyl
α-chlorotolyl
m-chlorotolyl
m-bromotolyl
bromo-o-xylyl
α,β-dichloronaphthyl
4-bromoacenaphthyl
carboxyphenyl
carboxytolyls
carboxyxylyls
carboalkoxylphenyls, e.g.,
    carbomethoxylphenyl
    carboethoxylphenyl
carbalkoxytolyls, e.g.,
    carbomethoxytolyls
acetophenyl
propiophenyl
butyrophenyl
lauroylphenyl
stearoylphenyl
p-acetotolyl
o-acetotolyl
α-benzoyl naphthyl β-benzoyl naphthyl
acetaminophenyl
acet-methylamino phenyl
o-acetoaminotolyl
p-acetoaminotolyl
α-acetoaminonaphthyl
β-acetoaminonaphthyl
propio-aminophenyl
butyro-aminophenyl
o-propio-aminotolyl
p-propio-aminotolyl
o-butyroaminotolyl
p-butyroaminotolyl
o-lauroylaminotolyl
p-lauroylaminotolyl
o-stearoylaminotolyl
sulfamyl phenyl
sulfamyl naphthyl Similarly, whether $n$ equals 1 or 2, suitable R substituents include those described above with respect to Y when $n$ equals 1 except, of course, that R may comprise the carbon atoms necessary to form a heterocyclic ring with N and Y. Such heterocyclic rings, of course, can correspond to those nitrogen containing heterocyclic rings described above. Such heterocyclic rings formed from the amido nitrogen atom R and Y when suitably selected can also include one or more additional hetero atoms, e.g., oxygen or sulfur in addition to the carbon atoms necessary to form the 5- or 6-membered heterocyclic ring. When $n$ equals 2, Y is suitably selected from bivalent bridging atoms such as alkylene of up to 8 carbon atoms and arylene, etc., as well as substituted derivatives thereof, e.g., halo substituted alkylene radicals. Suitable bivalent bridging radicals for Y when $n$ equals 2, therefore, include:

—CH₂CH₂—
—CH₂CH₂CH₂—
—CH₂CH₂CH₂CH₂—
—CH₂CH₂CH₂CH₂CH₂—

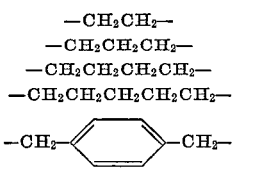

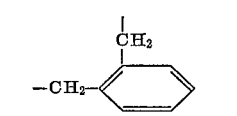

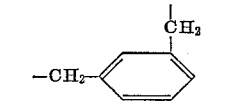

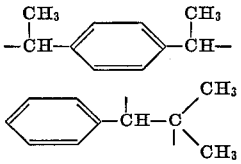

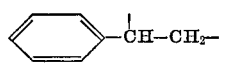

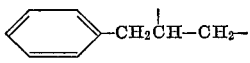

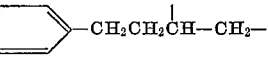

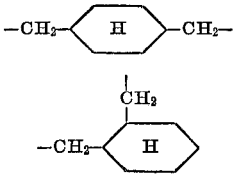

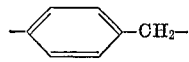

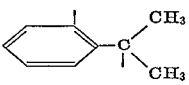

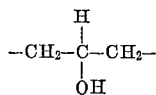

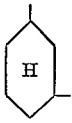

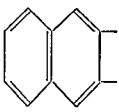

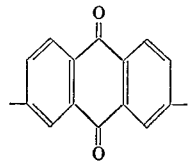

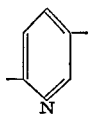

As indicated above, other non-chromophoric substituents may be present in the above radicals, e.g., —CHClCHCl—
—CHBrCH₂CHBr—

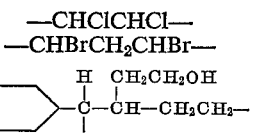

and the like.

The general procedure for preparing the compounds of this invention involves a condensation of bis hetero ketone with a selected cyanomethylene acrylamide or substituted acrylamide preferably in the presence of an acidic catalyst.

Suitable ketones include the following:

bis(3,5-dimethyl-4-propyl-3-pyrryl) ketone
bis(5-bromo-4-ethyl-3-methyl-2-pyrryl) ketone
bis(3-ethyl-5-methyl-2-pyrryl) ketone
bis(4-ethyl-3-methyl-2-pyrryl) ketone
bis(5-ethyl-3-methyl-2-pyrryl) ketone
bis(5-bromo-2-thienyl) ketone
bis(5-methyl-2-thienyl) ketone
bis(5-chloro-2-thienyl) ketone
5-chloro-2-thienyl 5-bromo-2-thienyl ketone
(5-chloro-2-thienyl) 2-thienyl ketone
5-methyl-2-thienyl 5-bromo-2-thienyl ketone
5-methyl-2-thienyl 5-chloro-2-thienyl ketone
2,5-dimethyl-3-thienyl 5-chloro-2-thienyl ketone
5-chloro-2-thienyl 5-ethyl-2-thienyl ketone
2,5-dimethyl-3-thienyl 2-thienyl ketone
bis(5-methyl-2-thienyl) ketone
bis(2,5-dimethyl-3-thienyl) ketone
2-furyl 3-indolyl ketone
bis-2-furyl ketone
bis-3-thienyl ketone 2-furyl 2-methyl-3-indolyl ketone
2-furyl 1-methyl-3-indolyl ketone
3-indolyl 2-thienyl ketone
2-pyrryl 2-thienyl ketone
2,5-dimethyl-3-thienyl 2-thienyl ketone
2,5-dimethyl-3-thienyl 2-furyl ketone
2-pyridyl 4- pyridyl ketone
3-pyridyl 4-pyridyl ketone
5-chloro-2-thienyl 2-furyl ketone
5-chloro-2-thienyl 3-furyl ketone
3-indolyl 5-methyl-2-thienyl ketone
3-indolyl 2-pyridyl ketone
3-indolyl 2-pyridyl ketone
2-thienyl 3-thienyl ketone
2-thienyl 5-(2-thienyl)-2-thienyl ketone
2-thienyl 6-(2-thienyl)-3-pyridyl
5-ethyl-2-thienyl 2-furyl ketone In addition to the above-contemplated derivatives, polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as:

| glycidol | ethylene oxide |
| epichlorohydrin | propylene oxide |
| butadiene dioxide | butylene oxide |
| isobutylene oxide | butylene dioxide |
| styrene oxide | isobutylene oxide | and the like to yield the corresponding polyoxyalkylated products. Among the types of compounds which are reactive in this manner are:

hydroxy compounds
amide compounds
carboxy compounds, etc.

From one to about 200 mols of oxyalkylating agent may be condensed with the said reactive compounds.

The following examples will serve to illustrate the present invention without being deemed limitative thereof. Parts are by weight unless otherwise indicated.

EXAMPLE 1

Preparation of α-cyano-β-bis (2-thienyl) acrylamide:

Into a 500 ml. three-necked flask fitted with a stirrer, thermometer, Barrett-type water separator (which allows the upper layer to be returned to the reaction flask), reflux condenser and heating mantle are added 50 grams of bis(2-thienyl) ketone M.W.=194, —0.25 mol), 21.0 grams of cyanoacetamide (m.2.=84, =0.25 mol), 4.0 grams of ammonium acetate, 24 mls. of glacial acetic acid and 50 mls. benzene. The reaction mixture is then heated to vigorous reflux and stirred for 55 hours at 98°–100° C. During this period, 1.0 gram additions of ammonium acetate are made after 7 hours, 25 hours and 30 hours. The benzene is then steam-distilled from the reaction mixture. The residue after steam distillation is filtered at 35° C. The solid material is washed on the funnel with 200 mls. of water and then ground in a mortar to break up lumps. This material is then heated to 75° C. with 250 mls. isopropanol cooled to 5° C., filtered and washed on the funnel with 100 mls. isopropanol at 5° C. After air drying at 75° C., there is obtained 56 grams of acrylamide.

EXAMPLE 2

Example 1 is repeated employing the following ketones in the acrylamide preparation:

(a) 3-thienyl ketone (bis-3-thienyl ketone)
(b) bis-2-furyl ketone
(c) bis (5-methyl-2-thienyl) ketone
(d) bis (5-chloro-2-thienyl) ketone
(e) 5-methyl-2-thienyl 5-bromo-2-thienyl ketone
(f) 2,5-dimethyl-3-thienyl 2-thienyl ketone
(g) 2-furyl 2-thienyl ketone
(h) 2-pyrryl 2-thienyl ketone
(i) 3-indolyl 2-pyridyl ketone
(j) 5-chloro-2-thienyl 2-furyl ketone

EXAMPLE 3

The product of Example 1 is used in a nitrocellulose lacquer as follows:

A mixture of 20 parts of Solution 1 and 80 parts of Solution II is prepared wherein Solution I consists of:

46 parts ½ sec. nitrocellulose
4 parts product of Example I
35 parts of Cellolyn 502 (non-drying plasticizing alkyd resin of Hercules Powder Co.)
15 parts dibutyl phthalate and Solution II consists of:

35 parts butyl acetate
15 parts butanol
50 parts toluene

The resulting lacquer solution is drawn out on a metal plate with a Bird film applicator to give a 3 mil film. A similar film is prepared without the product of Example 1. Upon exposure to ultraviolet light, the latter film yellows and deteriorates before any visible signs of yellowing are observed in the protected film.

EXAMPLE 4

Example 1 is repeated employing as the ketone, 2,5-dimethyl-3-thienyl-5-chloro-2-thienyl ketone.

EXAMPLE 5

Example 1 is again repeated, using as the ketone bis-(2,5-dimethyl-3-thienyl) ketone.

EXAMPLE 6

Example 2 is repeated employing, as the ketone, bis-(2-ethyl-hexyloxy-2-thienyl) ketone.

EXAMPLE 7

The product of Example 2(c) is incorporated into a synthetic latex as follows:

A 50% dispersion of the absorber of Example 2(c) is made by kneading 20 g. of the compound with 20 g. of formaldehyde - naphthalenesulfonate in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrile-butadiene latex (Chemigum 247) employing 5% of the absorber based on the weight of the latex. The latex is then sprayed onto leather. The film prepared in this manner shows less tendency to yellow on exposure to light than a similar film prepared in the same manner but omitting the ultraviolet absorber.

EXAMPLE 8

The product of Example 2(d) is prepared as a 3% solution in methyl Cellosolve and a sponge of polyvinyl chloride foam is impregnated therewith. The foam is prepared from the following formulation:

|  | Pts. |
|---|---|
| Marvinol VR–10 (polyvinyl chloride resin—U.S. Rubber) | 100 |
| Di-2-ethylhexylphthalate | 130 |
| Barium cadmium stabilizer (Advance BS-105) | 3.5 |
| Celogen (p,p'-oxybis(benzenesulfonyl)hydrazide | 35 |
|  | 258.5 |

The sponge is squeezed free of solvent and dried. It is much more stable to ultraviolet light than untreated material.

EXAMPLE 9

Example 1 is repeated, employing the following α-cyanoamides:

(a) α-cyano-N,N-dimethylacetamide
(b) α-cyano-N,N-diethyl acetamide
(c) α-cyano-N,N-di-n-propyl acetamide
(d) α-cyano-N,N-diallyl acetamide
(e) α-cyano-N,N-bis (β-chloroethyl) acetamide
(f) α-cyano-N,N-bis (β-cyanoethyl) acetamide
(g) α-cyano-N,N-bis (β-hydroxyethyl) acetamide
(h) α-cyano-N,N-bis (methoxyethyl) acetamide
(i) α-cyano-N,N-bis (ethoxyethyl) acetamide
(j) α-cyano-N,N-bis (carbomethoxyethyl) acetamide
(k) α-cyano-acetmorpholide (N-cyanoacetyl morpholine)
(l) α-cyanoacetpiperidide (N-cyanocetyl piperidine)
(m) N-cyanoacetylpyrrole
(n) N-cyanoacetyl pyrrolidone
(o) N-cyanoacetyl indole
(p) N-cyanoacetyl-α-methyl piperidine
(q) N-cyanoacetyl imidazole
(r) N-cyanoacetyl-1,2,3-oxathiazole
(s) N-cyanoacetylbenzimidazole
(t) α-cyano-N-methyl-N-ethyl acetamide
(u) α-cyano-N-methyl-N-hydroxyethyl acetamide

EXAMPLE 10

Examples 1 and 2 are repeated employing the following di-functional methylene compounds:

(a) bis-cyanoacetyl ethylene diamide
(b) bis-cyanoacetyl-p-phenylene diamide
(c) bis-cyanoacetyl-p-tolylene diamide
(d) bis-cyanoacetyl-p-cyclohexylene diamide
(e) bis-cyanoacetyl-1,3-propylene diamide
(f) bis-cyanoacetyl-1,4-butylene diamide
(g) bis-cyanoacetyl-3,5-dichloro-p-phenylene diamide
(h) bis-cyanoacetyl-3,5-dimethyl-p-phenylene diamide
(i) bis-cyanoacetyl-3,5-bis-methylsulfonyl-p-phenylene diamide
(j) bis-cyanoacetyl-3,5-carboethoxy-p-phenylene diamide
(k) bis-cyanoacetyl-2,2,3,3-tetrachloro-1,4-butylene diamide
(l) bis-cyanoacetyl-N,N′-diethylethylene diamide The products of Example 10 are bis-compounds with the following exemplifying formulae:

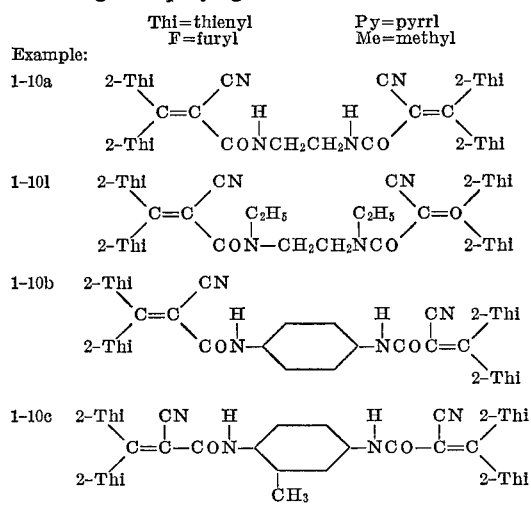

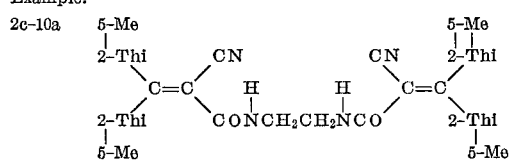

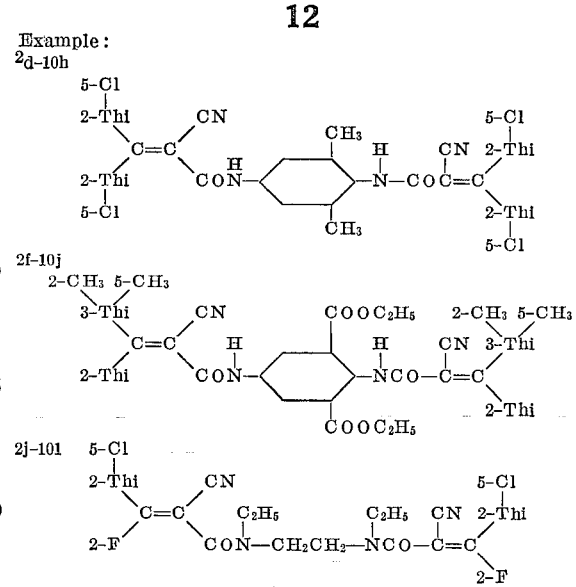

EXAMPLE 11

A 10 gm. swatch of "Dacron" (ethylene glycol terephthalic acid polyester) cloth is heated in an aqueous bath of 0.4 gm. of α-cyano-β-bis(2-thienyl) acrylamide dispersed in 300 mls. of water at 190° F. for 1 hour. The dispersion is prepared by adding to the 190° F. water while stirring vigorously, a solution of the acrylamide in 5 ml. of ethanol. The dried swatch is compared with an untreated sample after both are exposed to ultraviolet light in a fadeometer. After 100 hours, the untreated swatch shows a distinct yellow coloration, whereas the treated sample is unchanged.

EXAMPLE 12

Example 11 is repeated using the following compounds:

(a) Example 2(a)
(b) Example 2(c)
(c) Example 2(h)
(d) Example 5
(e) Example 9(a)
(f) Example 9(k)
(g) Example 9(q)
(h) Example 9(u)

Similar results as in Example 11 are obtained.

EXAMPLE 13

Examples 11 and 12 are repeated, using acrylic textile materials as follows:

(a) Films of homopolyacrylonitrile
(b) Films of copolymer (90% acrylonitrile, 10% vinyl pyridine)
(c) Films of polymer mixture (95% polyacrylonitrile, 5% polyvinylpyrrolidone)

Excellent stabilization is achieved in each instance.

EXAMPLE 14

To 100 gms. of powdered nylon 66 (polyhexamethylene adapamide) are added 1 g. of the absorber of Example 1. After thorough mixing, the mixture is extruded into fibers from a hot melt. A cloth is woven from said fibers and compared with a similar fabric without absorber in the manner of Example 11. The fabric containing the absorber exhibits superior ultraviolet light stability.

EXAMPLE 15

Example 14 is repeated using the following polymers:
(a) "Dacron"
(b) polyethylene
(c) polypropylene
(d) cellulose acetate(2.5 acetyl value)
(e) polyvinylidene chloride

EXAMPLE 16

Examples 14 and 15 are repeated using the absorbers of Examples 2(a), 2(e), 6, 9(m), 9(m), 9(a), 10(e) with ketone of Example 1, and 10(b) with ketone of Example 2(d).

EXAMPLE 17

The compound of Example 1 is oxyalkylated by treating it in an autoclave at 80° C. with 6 mols of ethylene oxide in the presence of 1.2% potassium hydroxide. The resultant product corresponds to the formula:

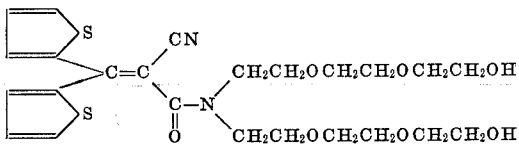

EXAMPLE 18

The product of Example 17 is dispersed in water (2 g./ 100 ml. H₂O) and the bath is used to impregnate paper, cotton fabric and gel regenerated cellulose. After drying the treated materials are excellently protected against ultraviolet light degradation.

The compounds of this invention are soluble in many diverse types of polymers, resins, waxes and the like, and therefore they are particularly suitable and adaptable for the stabilization of such materials as exemplified above. The nonoxyalklated products are insoluble in water. Those compounds which contain lesser amounts of oxyalkyl groups, that is, up to about 4–6 groups per molecule, are, in general, less soluble in the non-polar solvents but are readily dispersible in water. The compounds containing larger amounts of alkylene oxide, that is above about 6 mols thereof per mol of the base compounds, range from soluble in water with the solubility increasing as the number of oxyalkylene groups increases.

The ultraviolet absorbing compounds of the present invention may be used to stabilize all organic materials which are susceptible to ultraviolet degradation and are particularly useful in the stabilization of resins and plastics, whether they be in the form of films or molded products and either clear, opaque, semi-opaque, or translucent. Foam, plastics and fibers are also admirably stabilized by these compounds. Pigments, polishes, creams, lotions, paints, enamels, varnish films, and dyestuffs, when susceptible to ultraviolet degradation, have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight based upon the organic solids weight to be stabilized, may be used.

What is claimed is:

1. As essentially colorless compound exhibiting a prominent absorption peak in the range of 250 A. to 400 A. of the formula:

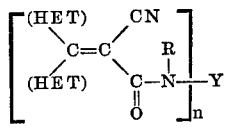

wherein:
  (a) each (HET) independently represents a monocyclic heterocyclic nucleus containing at least one pair of conjugated double bonds and selected from the group consisting of 5- and 6-membered heterocycles consisting of carbon atoms and from 1 to 3 hetero atoms selected from oxygen, nitrogen, and sulfur; and the corresponding benzo monocyclic heterocycles;
  (b) $n$ is an integer of 1 or 2;
  (c) R is hydrogen, alkyl of 1 to 30 carbon atoms, alkenyl of 3 to 25 carbon atoms, aryl of up to 14 carbon atoms, or the atoms necessary to form a heterocyclic ring with N and Y when $n=1$ selected from morpholino, piperidino, pyrrolyl, pyrrolidonyl, indolyl, 1,2,3-oxathiazolyl, and benzimidazolyl;
  (d) when $n=1$, Y is hydrogen, alkyl of 1 to 30 carbon atoms, alkenyl of 3 to 25 carbon atoms, aryl of up to 14 carbon atoms, or the atoms necessary to form a heterocyclic ring with N and Y when $n=1$ selected from morpholino, piperidino, pyrrolyl, pyrrolidonyl, indolyl, imidazolyl, 1,2,3-oxathiazolyl, and benzimidazolyl;
  (e) when $n=2$, Y is a bivalent radical selected from the group consisting of alkylene of up to 8 carbon atoms, arylene of up to 10 carbon atoms, 9,10-anthraquinonylene-2,7, and 2,5-pyridylene.

2. An essentially colorless compound exhibiting a prominent absorption peak in the range of 250 A. to 400 A. of the formula:

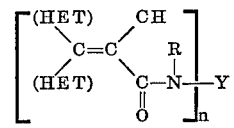

wherein:
  (a) each (HET) independently represents a monocyclic heterocyclic nucleus containing at least one pair of conjugated double bonds and selected from the group consisting of 5- and 6-membered heterocycles consisting of carbon atoms and from 1 to 3 hetero atoms selected from oxygen, nitrogen and sulfur; and the corresponding benzo monocyclic heterocycles;
  (b) $n$ is an integer of 1 or 2;
  (c) R is a substituent selected from the group consisting of hydrogen; alkyl of 1 to 30 carbon atoms; alkenyl of 3 to 25 carbon atoms; the halo, hydroxy, cyano, alkoxy, carboalkoxy, and hydroxyalkoxy, derivatives of said alkyls; phenyl; alkylphenyl; naphthyl, and the halo, alkoxy, carboxy, hydroxyalkyl, alkanoyl, benzoyl, alkanoylamino and sulfamyl derivatives of said phenyl, alkylphenyl and naphthyl, said substituents having up to 30 carbon atoms; and the atoms necessary to form a hetero ring with N and R selected from morpholino, piperidino, pyrrolyl, pyrrolidonyl, indolyl, imidazolyl, 1,2,3-oxathiazolyl and benzimidazolyl;
  (d) when $n=1$, Y is substituent selected from the group consisting of hydrogen; alkyl of 1 to 30 carbon atoms; alkenyl of 3 to 25 carbon atoms; the halo, hydroxy, cyano, alkoxy, carboalkoxy, and hydroxyalkoxy derivatives of said alkyls; phenyl; alkylphenyl; naphthyl, and the halo, alkoxy, carboxy, hydroxyalkyl, alkanoyl, benzoyl, alkanoylamino and sulfamyl derivatives of said phenyl, alkylphenyl, and naphthyl, said substituents having up to 30 carbon atoms; and the atoms necessary to form a hetero ring with N and R selected from morpholino, piperidino, pyrrolyl, pyrrolidonyl, indolyl, imidazolyl, 1,2,3 - oxathiazolyl and benzimidazolyl;
  (e) when $n=2$, Y is a bivalent radical selected from the group consisting of alkylene of up to 8 carbon atoms, arylene of up to 10 carbon atoms, 9,10-anthraquinonylene-2,7, and 2,5-pyridylene.

3. A compound as defined in claim 1 wherein each HET is monocyclic heterocyclic.

4. A compound as defined in claim 1 wherein each HET is benzomonocyclic heterocyclic.

5. A compound as defined in claim 1 wherein each HET is monocyclic sulfur heterocyclic.

6. A compound as defined in claim 1 wherein each HET is monocyclic nitrogen heterocyclic.

7. A compound as defined in claim 1 wherein each HET is monocyclic oxygen heterocyclic.

8. A compound as defined in claim 1 wherein each HET is thienyl.

9. A compound as defined in claim 1 where each HET is furyl.

10. A compound as defined in claim 1 wherein one HET is thienyl and the other HET is furyl.

11. A compound as defined in claim 1 wherein one HET is thienyl and the other HET is pyrryl.

12. A compound as defined in claim 1 wherein $n=1$.

13. A compound as defined in claim 1 wherein $n=2$.

14. A compound as defined in claim 12 wherein R and Y are hydrogen.

15. A compound as defined in claim 12 wherein R and Y are alkyl.

16. A compound as defined in claim 13 wherein R is hydrogen and Y is alkylene.

17. α-cyano-β-bis(2-thienyl)acrylamide.

18. α-cyano-β-bis(2,5-dimethyl-3-thienyl)acrylamide.

References Cited
UNITED STATES PATENTS 3,523,953    8/1970    Strobel et al. _____ 260—332.2

JOHN D. RANDOLPH, Primary Examiner

C. M. SHURKO, Assistant Examiner

U.S. Cl. X.R.

106—48, 163, 288; 117—138.5, 154; 252—401, 402, 403; 260— 13, 92.8, 248, 250, 256.4, 256.5, 262, 272, 294.9, 303, 306.8, 307, 307.5, 308, 309, 309.2, 310, 312, 326.3, 329.2, 330.5, 345.7, 346.2, 347.2, 347.3, 739, 78, 88.3, 88.7, 93.7, 94.9, 465.4